(12) United States Patent
Dobschal et al.

(10) Patent No.: US 7,298,557 B2
(45) Date of Patent: Nov. 20, 2007

(54) PROJECTION UNIT FOR A HEAD-UP DISPLAY

(76) Inventors: Hans-Juergen Dobschal, Am Koetschauer Weg 26a, D-99510 Kleinromstedt (DE); Dirk Jahn, Schuetzenhofstrasse 71, D-07743 Jena (DE)

( * ) Notice: Subject to any disclaimer, the term of this patent is extended or adjusted under 35 U.S.C. 154(b) by 0 days.

(21) Appl. No.: 11/377,110

(22) Filed: Mar. 16, 2006

(65) Prior Publication Data

US 2006/0209419 A1    Sep. 21, 2006

(30) Foreign Application Priority Data

Mar. 16, 2005   (DE) .................. 10 2005 012 011

(51) Int. Cl.
*G02B 27/10* (2006.01)
*G09G 5/00* (2006.01)

(52) U.S. Cl. ........................... 359/630; 345/7
(58) Field of Classification Search ........ 359/630–633; 345/7–9
See application file for complete search history.

(56) References Cited

U.S. PATENT DOCUMENTS 4,961,625 A  10/1990  Wood et al.
5,497,271 A *  3/1996  Mulvanny et al. .......... 359/631
5,805,119 A   9/1998  Erskine et al.
5,864,432 A *  1/1999  Deter ......................... 359/634
6,574,048 B2  6/2003  Nill
6,989,934 B2 *  1/2006  Aoki et al. .................... 345/7
2002/0167463 A1 * 11/2002  Inoguchi ....................... 345/8

FOREIGN PATENT DOCUMENTS

| DE | 690 09 569 | 7/1994 |
| DE | 691 20 575 | 10/1996 |
| DE | 695 06 174 | 4/1999 |
| DE | 103 46 884 | 5/2004 |
| EP | 0 377 773 | 7/1990 |
| EP | 0 486 165 | 5/1992 |
| EP | 0 643 315 | 3/1995 |
| EP | 0 450 553 | 7/1996 |
| EP | 0 686 865 | 11/1998 |
| EP | 1 291 701 | 3/2002 |

* cited by examiner

*Primary Examiner*—Alicia M Harrington
(74) *Attorney, Agent, or Firm*—Price Heneveld Cooper Dewitt & Litton LLP

(57) ABSTRACT

The invention is directed is directed to a projection unit for a head-up display having an image generator, a mirror and a refractive lens which are arranged in a housing one behind the other in the light propagation direction. The beam path is directed to a windshield. Notably the mirror has a concave reflection surface, and the lens has a free-form surface at lease on one of the optically active surfaces (D-U and/or D-O).

10 Claims, 3 Drawing Sheets

PROJECTION UNIT FOR A HEAD-UP DISPLAY

CROSS-REFERENCE TO RELATED APPLICATIONS

This application claims priority of German Application No. 10 2005 012 011.3, filed Mar. 16, 2005, the complete disclosure of which is hereby incorporated by reference.

BACKGROUND OF THE INVENTION a) Field of the Invention

The invention is directed to a projection unit for a head-up display comprising an image generator, a mirror and a refractive lens which are arranged in a housing one behind the other in the light propagation direction, wherein the beam path is directed to a windshield. An arrangement of this kind is applied chiefly in automotive construction, but is not limited to this.

b) Description of the Related Art

EP 0 377 773 B1 shows a display device for a head-up display which contains an image generator, a mirror element and a transparent cover. The imaging characteristics are not mentioned. However, it can be gathered from the drawings that the mirror element is plane and the cover is plane-parallel and curved in a convex manner toward the windshield.

DE 695 06 174 T2 describes a head-up display which uses an image generator and an aspheric mirror. The imaging characteristics are not mentioned.

EP 0 643 315 B1 describes a head-up display comprising an image generator, a plane deflecting mirror, and a lens. The lens covers the dashboard scoop of a motor vehicle. There is also no mention here of the imaging characteristics.

Further, DE 69120575T2, EP 0486165A1 and EP 1291701A1 describe other arrangements for a head-up display which can be realized with two or more mirrors. It has been shown in practice that the use of a plurality of mirrors requires considerable installation space, so that the requirements can only be met with great difficulty particularly for applications in passenger vehicles.

The principal function of optical elements in a head-up display is to transform the size of the image generator into the size of the desired image by means of optical imaging and/or to fold the beam path.

The light coming from an image-generating element reaches the eyes of the driver by way of at least two mirrors and the reflection at the windshield of the automobile and generates an image at a distance of approximately 2 m to 3 m in front of the driver which is located slightly below the actual viewing direction adopted when driving. In this way, it is possible to view the environment and the reflected information at the same time in a relaxed manner. Imaging of this kind has the following essential quality features:

image field size
eye box size (by which is meant the region at eye level from which the driver can still see the image when moving his/her head)
absence of distortion
resolution
brightness Since the windshield (WSS) does not have a typically regular surface shape but is also used for imaging, it is necessary to include a correction of the imaging error of the WSS. When using a maximum of four mirrors, this can only be achieved in that some mirrors must be constructed as free-form mirrors. Therefore, the simplest systems of this type comprise at least two free-form mirrors. However, manufacture of free-form mirrors is very cost-intensive and, since reflections are involved, they are also particularly susceptible to tolerances relating to surface shape and accuracy of installation.

OBJECT AND SUMMARY OF THE INVENTION

Therefore, it is the primary object of the invention to provide a comparatively simple optical arrangement for a head-up display in which installation space is minimized. The construction should not be susceptible to tolerances and the degrees of freedom for the dimensioning of the head-up display should be unlimited as far as possible. The image quality should be optimized in this connection.

According to the invention, this object is met in that the mirror has a concave reflection surface and in that at least one of the optically active surfaces of the lens has a free-form surface.

By free-form surface is meant, within the context of the present invention, a transparent, optically active surface for whose geometric definition more than one radius measurement is required.

The lens preferably has a cylindrical shape component extending transverse to the driving direction of the vehicle. In the most expedient embodiment of the invention, the lens is a concave-convex lens having a cylindrically shaped component. The surface D-O of the cylindrically shaped lens facing the windshield is concave and the cylindrical surface has a radius $R_2$, wherein the cylinder extends from the driver to the front-seat passenger in X-direction. Further, only the surface D-U of the cylindrically shaped lens facing the mirror is a free-form surface which is described by a coefficient set.

If necessary, additional spherical or plane mirrors can be arranged between the mirror with radius $R_1$ and the image generator for beam folding and beam shaping.

The invention presents a construction which substantially mitigates the disadvantages of the prior art described above through comparatively simple means.

The core idea of the invention consists in that the function of the free-form surface is transferred from the mirror to the transmitting cover glass and all additional reflective components are constructed only as standard, simple spherical mirrors. A cover glass for sealing the optical opening in the dashboard scoop is also already contained in all previously known systems and, in the latter, is mostly designed with respect to surface shape and installation position in such a way that, as far as possible, no reflected light can reach the human eye. For example, an advantageous typical embodiment form is a concentric cylindrical meniscus with a 15-degree tilt relative to the principal ray with meniscus radii of approximately 300 mm. In order to make further use of the advantageous reflection suppression, the installation position and radii of curvature are left approximately the same as before and a free-form function bringing about the required imaging quality together with the additional spherical components is added at least to the underside of the cover glass. This arrangement has a number of substantial advantages:

1. reduced installation space in the dashboard;
2. lower susceptibility to tolerances because the free-form surface is used in transmission and, further, fewer components are necessary in all;
3. no reflective free-form element is needed;
4. very large image sizes and eye box sizes are made possible at the same time with very good distortion correction over the entire eye box region.

In particular, it is possible by means of the invention to make do, apart from the cover glass, with only one optical imaging element in the form of a spherical mirror, which results in an enormous reduction in installation space and cost. The smaller deflecting angles that are therefore required at the spherical mirror have a very positive effect on the overall imaging quality which is appreciably better than in the previous known conventional multi-mirror systems.

The invention will be described in the following with reference to the drawings.

DESCRIPTION OF THE PREFERRED EMBODIMENTS

Figure 1:
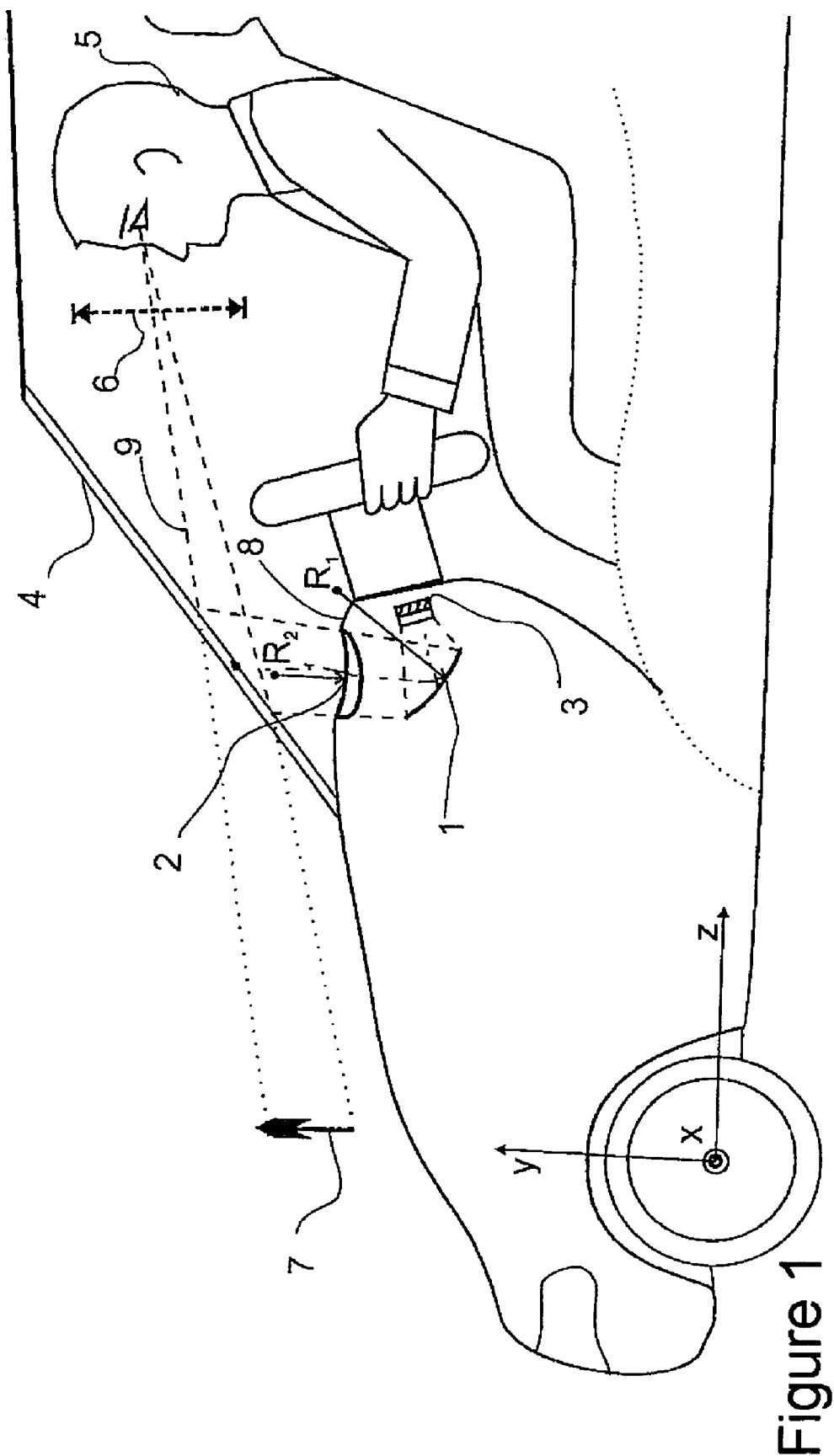
FIG. 1 shows an optical system for a head-up display with a mirror and cylindrical lens in the dashboard scoop.

FIG. 1 is a schematic illustration of the construction of an optical system for a head-up display. An image generator 3 is arranged at a distance in front of a spherical mirror 1 which has a concave curvature with radius $R_1$. This mirror 1 folds the beam path and exerts an imaging action. The mirror 1 guides the beam path 9 in direction of the windshield 4 through a cylindrical lens 2. The cylindrical lens 2 functions at the same time as a cover which closes the opening in the dashboard scoop 8.

The image generator 3 can comprise, for example, a lamp, a laser, or LEDs as light source and can be a DLP, LCOS or LCD type, for example. However, the image generator can also generate light itself and can be, e.g., a plasma panel.

In the following, the coordinates of the components refer to a global coordinate system. The origin of this coordinate system is located in the front vehicle axle. The positive Z-axis faces away from the driving direction, the positive X-axis faces from the driver to the front-seat passenger, and the positive Y-axis is directed vertically upward.

In the example, the generated image has a size of 258 mm×107 mm at a distance of 2400 mm from the eye box.

The eye box size is 160 mm×120 mm and the image generator size is 44.5 mm×18.5 mm. The coordinates of the components are determined as follows with reference to the global coordinate system:

The abbreviations are defined as follows:

WSS: windshield 4

D-O: the surface of the cylindrical lens 2 facing the windshield 4

D-U: the surface of the cylindrical lens 2 facing the mirror 1

S: mirror 1

TFT: image generator 3

X, Y, Z: global coordinates $\alpha$, $\beta$, $\gamma$: rotation around the X-, Y- and Z-axes in the global coordinate system.

The aperture regions with reference to the surface-oriented coordinate system are as follows:

|     | X   | Y   | delta-X | delta-y |
| --- | --- | --- | ------- | ------- |
| WSS | 194 | 153 | −381.3  | 764.3   |
| D-O | 197 | 230 | −3.9    | 26.2    |
| D-U | 197 | 230 | 41.3    | 20.8    |
| S   | 195 | 137 | −43.7   | −1.9    |

The set of coefficients of the free-form approximation describing the surface shape of the windshield is, for example:

| | | | | | |
|---|---|---|---|---|---|
| X: | 1.1835E+00 | Y: | 1.3870E+01 | $X_2$: | 4.7153E−03 |
| XY: | 5.8758E−04 | $Y_2$: | −2.4067E−02 | $X_3$: | 3.3032E−06 |
| $X_2Y$: | −6.6339E−06 | $XY_2$: | −5.0403E−06 | $Y_3$: | 1.9688E−05 |
| $X_4$: | 2.1657E−09 | $X_3Y$: | −3.0617E−10 | $X_2Y_2$: | 3.8752E−09 |
| $XY_3$: | 3.7403E−09 | $Y_4$: | −5.6020E−09 | | |

The mirror 1 has a spherical radius $R_1$=616.5 mm (CC) concave. The cylindrical lens 2 is made from BK7. Its surface D-O facing the windshield 4 is a cylindrical surface with radius $R_2$=350 mm concave. The surface D-U of the cylindrical lens 2 facing the mirror is a free-form surface that is described by the following coefficient set:

|         | X          | Y         | Z         | α        | β       | γ       |
| ------- | ---------- | --------- | --------- | -------- | ------- | ------- |
| image   | −356.44463 | 557.58814 | 1768.36577 | 7.046   | 0.89    | 0.0     |
| eye box | −394.5     | 858.084   | 4199.57   | 7.046    | 0.0     | 0.0     |
| WSS     | 0.0        | 0.0       | 0.0       | 0.0      | 0.0     | 0.0     |
| D-O     | −364.48    | 660.844   | 3356.77   | −75.0    | 0.0     | 0.0     |
| D-U     | −409.11063 | 655.844   | 3361.0459 | −75.0    | 0.0     | 0.0     |
| S       | −312.19744 | 570.13337 | 3295.502  | −140.2064 | −3.9591 | −1.4515 |
| TFT     | −325.94383 | 663.81838 | 3509.69942 | −160.9170 | −2.9841 | −4.7356 |

| | | | | | |
|---|---|---|---|---|---|
| X: | 5.7331E−03 | Y: | 1.3933E−02 | | |
| $X_2$: | −5.5924E−05 | XY: | 1.4698E−04 | $Y_2$: | −1.3483E−03 |
| $X_3$: | −1.0048E−06 | $X_2Y$: | −5.9218E−07 | $XY_2$: | −4.4575E−07 |
| $Y_3$: | −8.5050E−07 | $X_4$: | 2.2939E−09 | $X_3Y$: | 2.1946E−09 |
| $X_2Y_2$: | 5.2100E−09 | $XY_3$: | −2.3643E−10 | $Y_4$: | −2.3503E−09 |
| $X_4Y$: | −5.3211E−12 | $X_3Y_2$: | −2.6807E−12 | $X_2Y_3$: | −3.5541E−11 |
| $XY_4$: | −8.4157E−12 | | | | |

The free-form surface is characterized by the following polynomial:

$$z := \sum_{i=0}^{N} c_{i,j} \cdot x^i \cdot y^j$$

The coefficient values above are indicated on the following basis: XmYn designates the c-coefficient appearing before the polynomial term with the m-th power of x and the n-th power of y.

Figure 2:
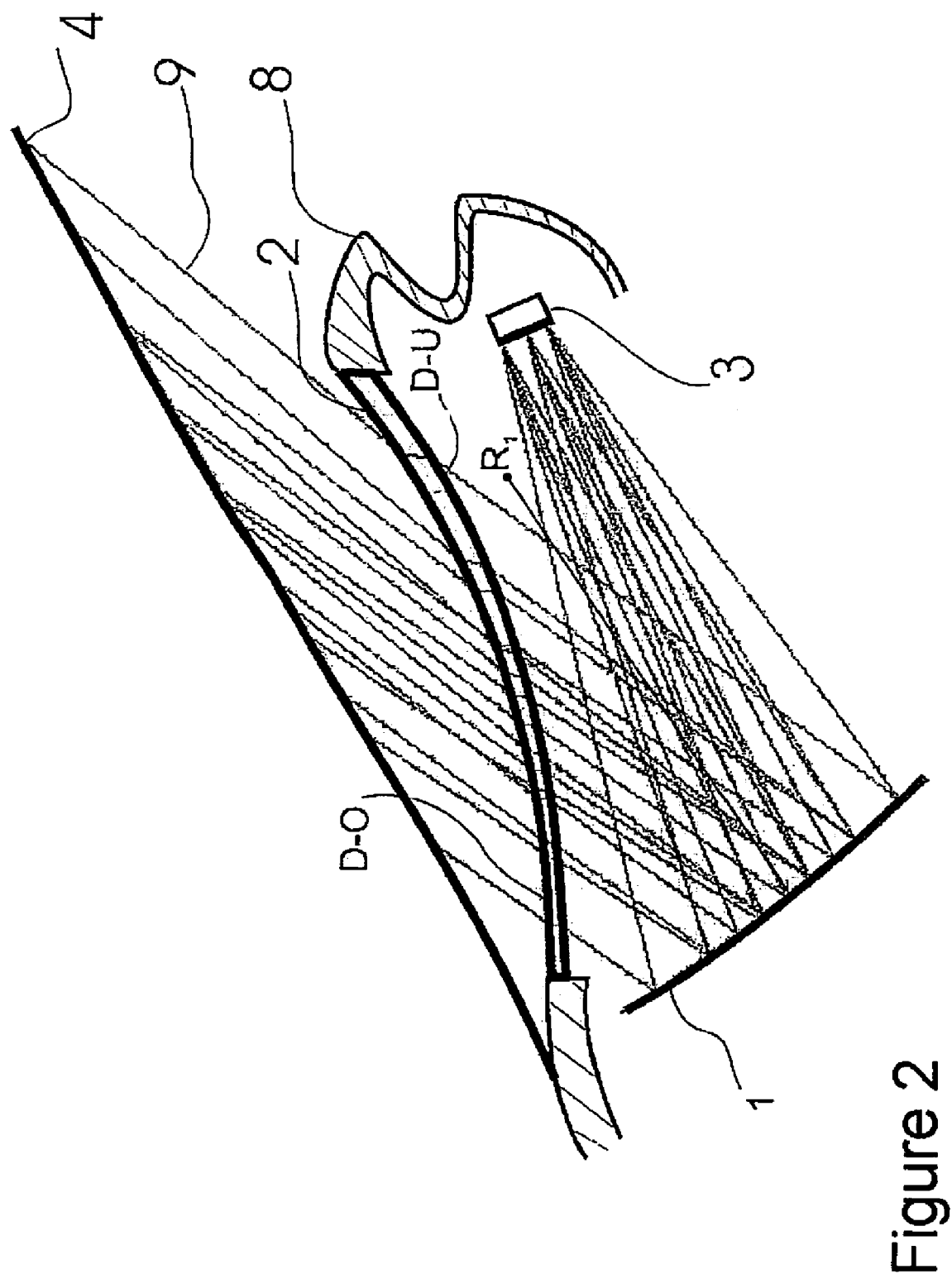
FIG. 2 shows a beam path in the optical system according to FIG. 1.

FIG. 2 shows a closer view of the beam path of the arrangement according to FIG. 1. Another example will now be described in which the two optical surfaces D-O and D-U of the cylindrical lens 2, which also serves to cover the opening in the dashboard scoop 8, are formed as free-form surfaces.

The generated image has a size of 258 mm×107 mm at a distance of 2400 mm from the eye box. The size of the eye box is 160 mm×120 mm, the size of the image generator is 44.5 mm×18.5 mm.

The coordinates of the components are determined as follows with reference to the global coordinate system:

|  | X | Y | Z | α | β | γ |
|---|---|---|---|---|---|---|
| image | −356.44463 | 557.58814 | 1768.36577 | 7.046 | 0.89 | 0.0 |
| eye box | −394.5 | 858.084 | 4199.57 | 7.046 | 0.0 | 0.0 |
| WSS | 0.0 | 0.0 | 0.0 | 0.0 | 0.0 | 0.0 |
| D-O | −364.48 | 660.844 | 3356.77 | −75.0 | 0.0 | 0.0 |
| D-U | −474.93183 | 655.844 | 3406.4646 | −75.0 | 0.0 | 0.0 |
| S | −312.19744 | 570.13337 | 3295.502 | −142.7219 | −5.1801 | −1.7188 |
| TFT | −346.99208 | 661.62592 | 3544.1176 | −155.8945 | −0.8317 | −12.8622 |

The abbreviations are defined as follows:

WSS: windshield 4

D-O: the surface of the cylindrical lens 2 facing the windshield 4

D-U: the surface of the cylindrical lens 2 facing the mirror 1

S: mirror 1

TFT: image generator 3

The aperture regions with reference to the respective surface-oriented coordinate system are as follows:

|  | X | Y | delta-X | delta-y |
|---|---|---|---|---|
| WSS | 194 | 153 | −381.3 | 764.3 |
| D-O | 197 | 200 | −5.4 | 6.2 |
| D-U | 197 | 200 | 105.6 | −43.7 |
| S | 195 | 133 | −45.2 | −2.3 |

The mirror 1 (S) has a spherical radius $R_1$=720.88 mm (CC) concave. The windshield 4 (WSS) is described by the coefficient set of the free-form approximation:

| X: | 1.1835E+00 | Y: | 1.3870E+01 | $X_2$: | 4.7153E−03 |
|---|---|---|---|---|---|
| XY: | 5.8758E−04 | $Y_2$: | −2.4067E−02 | $X_3$: | 3.3032E−06 |
| $X_2Y$: | −6.6339E−06 | $XY_2$: | −5.0403E−06 | $Y_3$: | 1.9688E−05 |
| $X_4$: | 2.1657E−09 | $X_3Y$: | −3.0617E−10 | $X_2Y_2$: | 3.8752E−09 |
| $XY_3$: | 3.7403E−09 | $Y_4$: | −5.6020E−09 |  |  |

The cylindrical lens 2 is made from BK7. The upper side D-O facing the windshield is a free-form surface which is described by the following coefficient set:

| K: | 0.0000E++00 | X: | −2.0366E−01 | Y: | −4.1825E−02 |
|---|---|---|---|---|---|
| $X_2$: | −7.4214E−04 | XY: | −3.9811E−04 | $Y_2$: | −4.4366E−04 |
| $X_3$: | 1.4287E−06 | $X_2Y$: | −4.1742E−07 | $XY_2$: | 4.6812E−06 |
| $Y_3$: | 7.7970E−07 | $X_4$: | 3.5271E−09 | $X_3Y$: | −6.8491E−09 |
| $X_2Y_2$: | −1.4704E−08 | $XY_3$: | −2.2426E−08 | $Y_4$: | −3.5412E−09 |
| $X_4Y$: | −3.0562E−11 | $X_3Y_2$: | −4.4745E−11 | $X_2Y_3$: | 8.5034E−12 |
| $XY_4$: | 1.1319E−10 | NTERMS: | 2.6000E+01 |  |  |

The underside D-U facing the mirror is likewise a free-form surface and has the following coefficient set:

| K:       | 0.0000E++00  | X:       | −3.4122E−02 | Y:       | −6.5419E−02 |
|----------|--------------|----------|-------------|----------|-------------|
| $X_2$:   | −8.5937E−04  | XY:      | 3.3845E−04  | $Y_2$:   | −7.0149E−04 |
| $X_3$:   | −1.4186E−06  | $X_2Y$:  | −8.1136E−07 | $XY_2$:  | 3.9958E−06  |
| $Y_3$:   | −7.4945E−07  | $X_4$:   | 5.3753E−09  | $X_3Y$:  | −1.1800E−09 |
| $X_2Y_2$:| 1.1432E−08   | $XY_3$:  | 9.0711E−10  | $Y_4$:   | −1.6782E−08 |
| $X_4Y$:  | −2.7840E−11  | $X_3Y_2$:| −7.1394E−11 | $X_2Y_3$:| 4.2042E−12  |
| $XY_4$:  | 1.0180E−10   |          |             |          |             |

The free-form surface is characterized by the following polynomial:

$$z := \sum_{i=0}^{N} c_{i,j} \cdot x^i \cdot y^j$$

The coefficient values above are indicated on the following basis: XmYn designates the c-coefficient appearing before the polynomial term with the m-th power of x and the n-th power of y.

Figure 3:
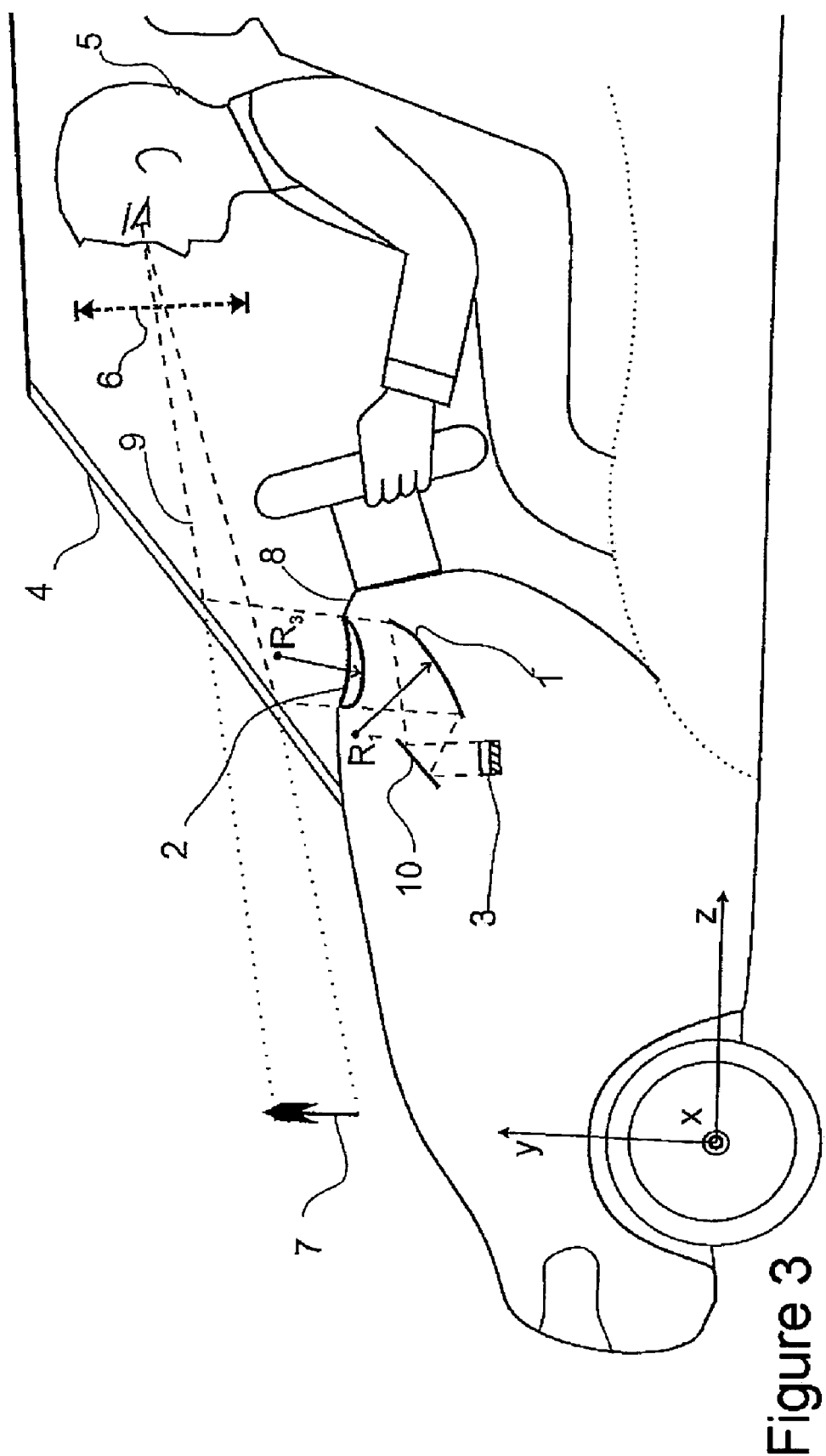
FIG. 3 shows an optical system for a head-up display with two mirrors and a cylindrically shaped lens in the dashboard scoop.

FIG. 3 shows a head-up display in a motor vehicle in which another mirror is used as a deflecting mirror 10 in order to fold the beam path. In this case, free-form surfaces are also provided only for the optical surfaces of the cylindrical lens 2. The deflecting mirror 10 has a radius ∞ and is a plane mirror in the example. However, it can also be curved in a concave or convex manner or can be aspheric. In this example, the free-form surface is formed on the optical surface D-O facing the windshield 4. The surface D-U of the cylindrical lens 2 facing the mirror 1 has radius $R_3$.

While the foregoing description and drawings represent the present invention, it will be obvious to those skilled in the art that various changes may be made therein without departing from the true spirit and scope of the present invention.

REFERENCE NUMBERS 1 mirror (S)
2 cylindrical lens (D-O; D-U)
3 image generator (TFT)
4 windshield (WSS)
5 driver
6 eye box
7 virtual image
8 dashboard scoop
9 projection beams
10 deflecting mirror
X, Y, Z coordinate system
α, β, γ rotation around the X-, Y- and Z-axes
$R_1$ concave radius of the mirror
$R_2$ concave radius of the lens
$R_3$ convex radius of the lens

What is claimed is:

1. A projection unit for a head-up display comprising:
   an image generator;
   a mirror; and
   a refractive lens;
   said imager generator, mirror and refractive lens being arranged in a housing one behind the other in light propagation direction; and
   a beam path of said projection unit being directed to a windshield;
   said mirror having a light-bundling reflection surface; and
   said lens having a free-form surface at least on one of an optically active surface.

2. The projection unit for a head-up display according to claim 1, wherein one of the optically active surfaces of the lens has a cylindrical component extending in a direction from the driver to the front-seat passenger.

3. The projection unit for a head-up display according to claim 1, wherein the lens has a plano-convex to concave-convex cylindrical component.

4. The projection unit for a head-up display according to claim 3, wherein the surface of the lens facing the windshield has a constant concave radius.

5. The projection unit for a head-up display according to claim 3, wherein the surface of the lens facing the mirror has a constant convex radius.

6. The projection unit for a head-up display according to claim 1, wherein the surface of the lens facing the windshield is a concave free-form surface and the surface of the lens facing the mirror is a convex free-form surface.

7. The projection unit or a head-up display according to claim 1, wherein additional spherical or plane mirrors are arranged between the mirror and the image generator for beam folding and beam shaping.

8. The projection unit for a head-up display according to claim 1, wherein the lens simultaneously serves as a cover for the opening of the dashboard scoop.

9. The projection unit for a head-up display according to claim 1, wherein the concave reflection surface of the mirror has a spherical radius.

10. The projection unit for a head-up display according to claim 1, wherein the concave reflection surface of the mirror is aspheric.

* * * * *